US006885799B2

United States Patent
Lee

(10) Patent No.: US 6,885,799 B2
(45) Date of Patent: Apr. 26, 2005

(54) OPTICAL RIBBON FIBER INCLUDING STRENGTH MEMBERS

(75) Inventor: Ho-Soon Lee, Taegukwangyok-shi (KR)

(73) Assignee: Samsung Electronics Co. Ltd., Suwon-si (KR)

(*) Notice: Subject to any disclaimer, the term of this patent is extended or adjusted under 35 U.S.C. 154(b) by 59 days.

(21) Appl. No.: 10/427,419

(22) Filed: May 1, 2003

(65) Prior Publication Data

US 2004/0114889 A1 Jun. 17, 2004

(30) Foreign Application Priority Data

Dec. 17, 2002 (KR) .................................. 10-2002-0080600

(51) Int. Cl.[7] .............................................. G02B 6/44
(52) U.S. Cl. ..................................................... 385/114
(58) Field of Search .......................... 385/114, 100–108

(56) References Cited

U.S. PATENT DOCUMENTS

| 3,887,265 A | * | 6/1975 | Margolis et al. ............ 385/114 |
| 4,355,865 A | * | 10/1982 | Conrad et al. ............... 385/114 |
| 5,319,730 A | * | 6/1994 | Rasanen et al. ............. 385/114 |
| 5,673,352 A | * | 9/1997 | Bauer et al. ................. 385/114 |
| 5,737,470 A | * | 4/1998 | Nagano et al. ............. 385/114 |
| 6,185,350 B1 | * | 2/2001 | Tachikura et al. .......... 385/102 |
| 6,577,797 B1 | * | 6/2003 | Quiroz ......................... 385/114 |
| 2002/0197033 A1 | * | 12/2002 | Patel ............................ 385/114 |

FOREIGN PATENT DOCUMENTS

| DE | 3131424 A1 | * | 2/1983 | ................. 385/114 |
| GB | 2017955 A | * | 10/1975 | ................. 385/114 |
| JP | 62-8111 A | * | 1/1987 | ................. 385/114 |

* cited by examiner

Primary Examiner—Rodney Bovernick
Assistant Examiner—Mike Stahl
(74) Attorney, Agent, or Firm—Cha & Reiter, L.L.C.

(57) ABSTRACT

An optical ribbon fiber is disclosed and includes a plurality of optical fibers aligned in series, at least one strength member arranged at both side ends of the optical fibers or interposed between the optical members in order to reinforce a tensile strength of the optical ribbon fiber, and a ribbon coating layer coated onto outer surfaces of the optical fibers and the strength members so as to bond the optical fibers to the strength members.

8 Claims, 6 Drawing Sheets

FIG. 2 [Prior Art]

OPTICAL RIBBON FIBER INCLUDING STRENGTH MEMBERS

CLAIM OF PRIORITY

This application claims priority to an application entitled "Optical ribbon fiber including strength members", filed in the Korean Intellectual Property Office on Dec. 17, 2002 and assigned Serial No. 2002-80600, the contents of which are hereby incorporated by reference.

BACKGROUND OF THE INVENTION

1. Field of the Invention

The present invention relates to an optical ribbon fiber, and more particularly to an optical ribbon fiber including a strength member.

2. Description of the Related Art

An optical fiber cable has a larger bandwidth, a smaller diameter, a lighter weight than those of a metal cable and a higher information rate. In addition, the optical fiber cable affords non-inductive broadband transmission with low transmission loss, and has been widely used instead of the metal fiber cable. Particularly due to its large bandwidth, a small diameter and a superior information rate while ensuring the broadband transmission at low transmission loss, optical fiber cable can simultaneously transmit various signals, such as a telephone sound and AV signals originating from different systems. For this reason, the optical cable fiber is widely used as a communication medium in the fields of public communication and cable community antenna television (cable CATV), and in factories, buildings, and laboratories. At present, the optical fiber cable forms the basis of an Integrated Services Digital Network (ISDN).

FIG. 1 shows an optical ribbon fiber 100 including optical fibers 110 aligned in series. Referring to FIG. 1, the optical ribbon fiber 100 has the optical fibers 110 aligned sideways in series and a ribbon coating layer 120 surrounding the optical fibers 110.

Each of the optical fibers 110 includes a core 111 formed at a center thereof and a clad 113 surrounding an outer surface of the core 111. A coating layer 112 is coated on an outer surface of the clad 113 in order to protect the core 111 and the clad 113. A coloring layer having any one of various possible colors can be coated on an outer surface of the coating layer 112 so as to readily distinguish the optical fibers 110 from each other. An optical signal longitudinally incident to the optical fiber 110 passes through the core 111 and is totally reflected at a boundary surface of the core 111 and the clad 113 due to a differential refractive index a the boundary.

The ribbon coating layer 120 includes an ultraviolet (UV) curing agent and is coated on outer surfaces of the optical fibers 110 aligned in series so as to bond the optical fibers 110 to each other.

FIG. 2 is a sectional view showing a conventional optical ribbon fiber 200 including a spacer 230. Referring to FIG. 2, the optical ribbon fiber 200 has a plurality of optical fibers 210 aligned sideways in series, a ribbon coating layer 220 coated on outer surfaces of the optical fibers 210, and at least one spacer 230 positioned between the optical fibers 210.

Each of the optical fibers 210 includes a core 211, a clad 212 and a coating layer 213 surrounding an outer surface of the clad 212.

The spacer 230 is interposed between the optical fibers 210 when the optical fibers 210 are aligned and has a size identical to a size of the optical fiber 210. The spacer 230 constantly maintains a space formed between the optical fibers 210 when aligning the optical fibers 210 and enhances the strength of the optical ribbon fiber 200. The ribbon coating layer 220 is coated on outer surfaces the spacer 230 and the optical fibers 210 aligned in series.

However, the above optical fiber is made of material having a weak tensile strength. Accordingly, making the optical ribbon fiber usable requires configuring it with a plurality of strength members and a plurality of elements capable of improving an environmental characteristic.

U.S. Pat. No. 6,421,487, which is issued to Curtis John Hutton, et. al., and entitled "Reinforced Buffered Fiber Optic Ribbon Cable", discloses an optical ribbon fiber cable including an optical ribbon fiber formed with a reinforcement layer.

According to the Hutton's optical ribbon fiber cable, a reinforcement layer is coated on an outer surface of the optical ribbon fiber. In addition, the Hutton's optical ribbon fiber cable includes a central strength member and a plurality of auxiliary strength members for improving the tensile strength of the optical ribbon fiber cable. Furthermore, a plurality of wet-proof members are provided to improve the wet-proof characteristic of the optical ribbon fiber cable, thereby enhancing a physical characteristic of the optical ribbon fiber cable with respect to an external environment.

However, the Hutton's optical ribbon fiber cable requires complicated fabricating processes and enlarges an outer diameter of the optical ribbon fiber cable. That is, the Hutton's optical ribbon fiber cable uses a plurality of strength members and wet-proof members in order to enhance the tensile strength of the optical ribbon fiber cable and in order to improve the physical characteristic of the optical ribbon fiber cable with respect to the external environment. For this reason, the optical ribbon fiber cable is bulky in volume and costly to manufacture.

SUMMARY OF THE INVENTION

The present invention has been made to solve the above-mentioned problems occurring in the prior art. The present invention is directed providing an optical ribbon fiber capable of reducing the volume and weight of an optical fiber cable having the optical ribbon fiber, while enhancing a tensile strength of the optical ribbon fiber in such a manner that the optical fiber can be securely connected to a communication system.

There is accordingly provided an optical ribbon fiber comprising a plurality of optical fibers aligned in series, at least one strength member arranged in line with the optical fibers in order to reinforce a tensile strength of the optical ribbon fiber, and a ribbon coating layer coated onto outer surfaces of the optical fibers and the strength member so as to bond the optical fibers to the strength member.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENT

Figure 1:
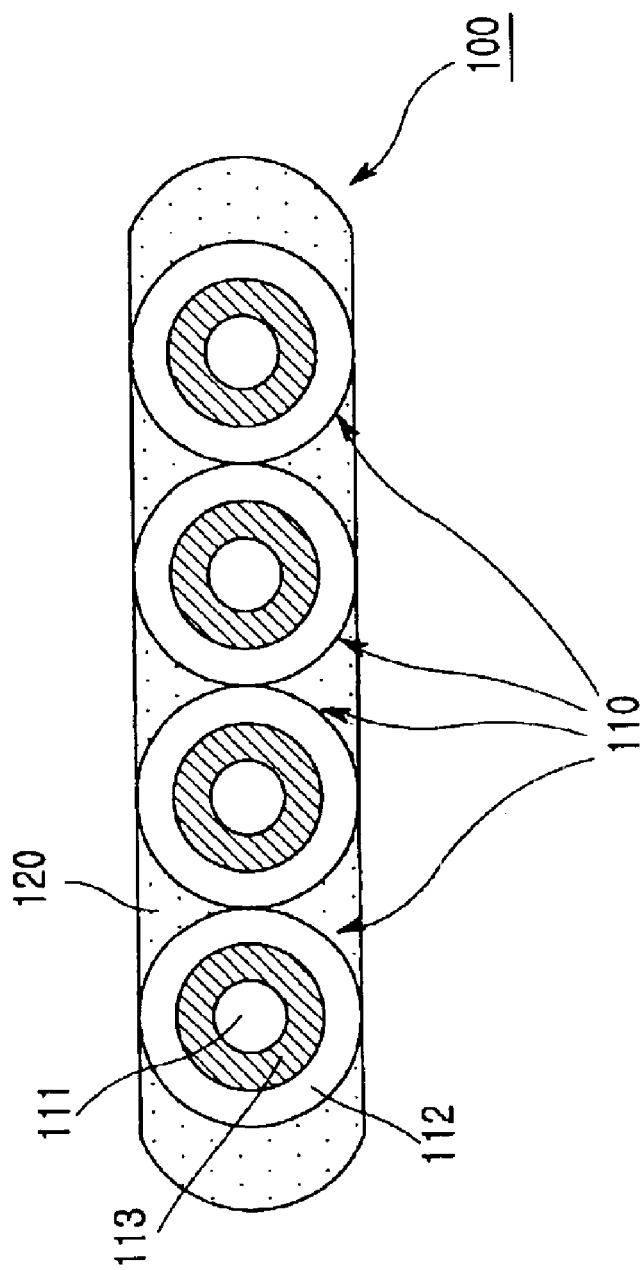
FIG. 1 is a sectional view showing a conventional optical ribbon fiber.
Figure 2:
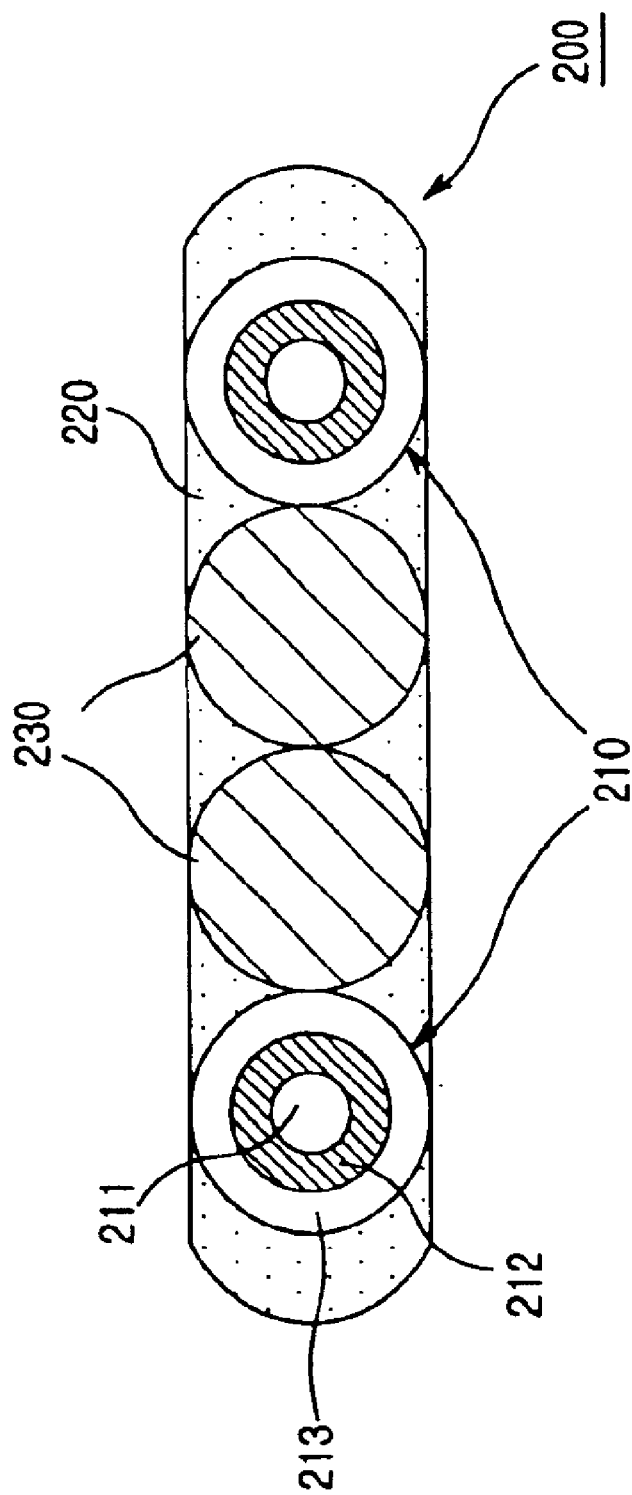
FIG. 2 is a sectional view showing a conventional optical ribbon fiber having a spacer.
Figure 3:
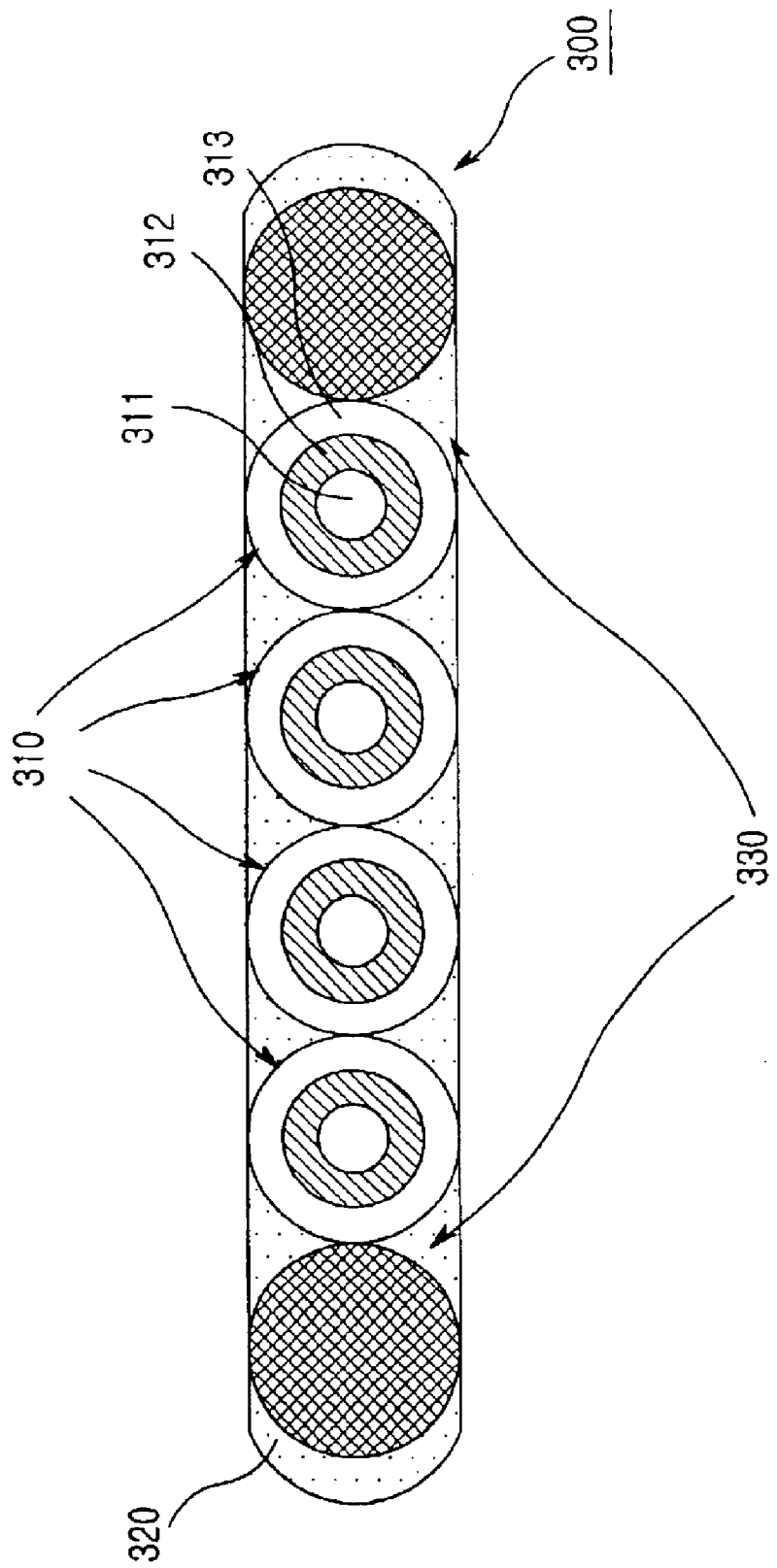
FIG. 3 is a sectional view showing an optical ribbon fiber having strength members accommodated therein according to a first embodiment of the present invention.

Hereinafter, preferred embodiments of the present invention will be described with reference to the accompanying drawings. FIG. 3 is a sectional view showing an optical ribbon fiber 300 having strength members, which are aligned together with optical fibers, according to a first embodiment of the present invention. Referring to FIG. 3, the optical ribbon fiber 300 includes a plurality of optical fibers 310 aligned sideways in series, strength members 330 arranged at both ends of the optical fibers 310, and a ribbon coating layer 320.

Each of the optical fibers 310 has a core 311 formed at a center thereof, a clad 312 surrounding the core 311, and a coating layer 313 coated on an outer surface of the clad 312 in order to protect the core 311 and the clad 312. A coloring layer can be formed at an outer surface of the coating layer 313 in various possible colors so as to discriminate the optical fibers 310 from each other. An optical signal longitudinally incident to the optical fiber 310 passes through the core 311 while being totally reflected at a boundary surface of the core 311 and the clad 312 due to a differential refractive index at the boundary.

The strength members 330 are each positioned at a respective end of the line of optical fibers 310 and in alignment with the line of the optical fibers 310 so as to enhance a tensile strength of the optical ribbon fiber 300. The strength members 330 have a diameter identical to a diameter of the optical fiber 310. In addition, the strength members 330 are made of material having a thermal expansion coefficient of $5.0 \times 10^{-6}$/K to $1.0 \times 10^{-8}$/K, and an elastic coefficient above $1.0 \times 10^{3}$ N/mm$^2$.

Since the strength member 330 is made of material having the thermal expansion coefficient lower than that of the ribbon coating layer, a microbending phenomenon created in the optical fibers 310 due to a temperature variation can be reduced. In addition, since the strength members 330 are made of material having the elastic coefficient above $1.0 \times 10^{-3}$ N/mm$^2$, the tensile strength of the optical ribbon fiber 300 is enhanced.

The ribbon coating layer 320 is made of thermoplastic material having a thermal expansion coefficient about $1.0 \times 10^{-3}$/K to $1.0 \times 10^{-5}$/K, such as UV curing resin, PVC, nylon, and polyolefin. By coating thermoplastic material onto outer surfaces of the optical fibers 310, the optical fibers 310 are bonded to the strength members 330.

Figure 4:
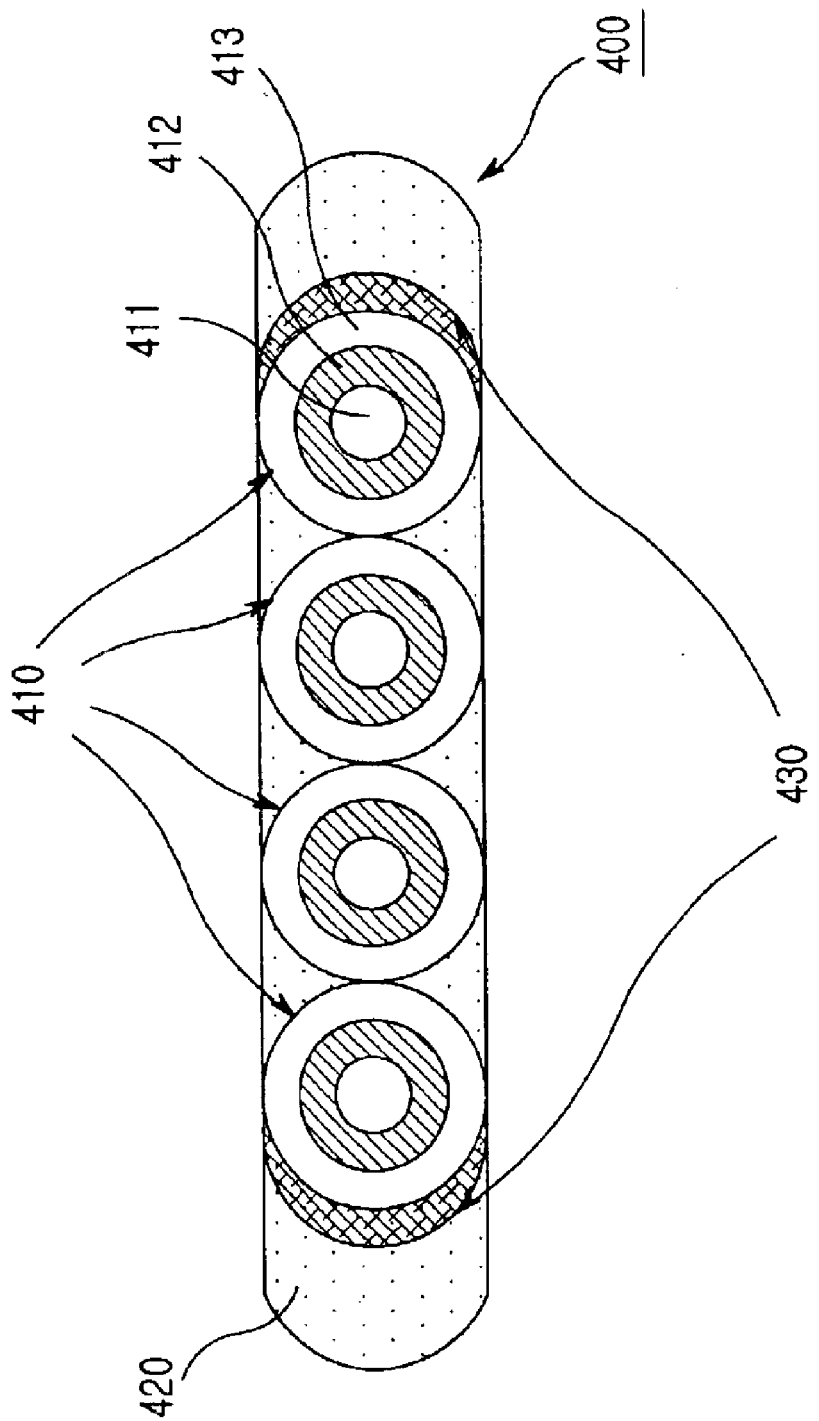
FIG. 4 is a sectional view showing an optical ribbon fiber having strength members accommodated therein according to a second embodiment of the present invention.

FIG. 4 is a sectional view showing an optical ribbon fiber 400 formed with strength members having a semicircular-shaped sectional area according to a second embodiment of the present invention. Referring to FIG. 4, the optical ribbon fiber 400 includes a plurality of optical fibers 410 aligned in series, strength members 430 arranged at both ends of the optical fibers 410, and a ribbon coating layer 420.

Each of the optical fibers 410 has a core 411 formed at a center thereof, a clad 412 surrounding the core 411, and a coating layer 413 coated on an outer surface of the clad 412 in order to protect the core 411 and the clad 412.

Since the strength members 430 have the semicircular-shaped sectional area having a radius identical to a radius of the optical fiber 410, the strength members 430 can be arranged at both ends of the optical fibers 410 in line with the optical fibers 410. The strength members 430 shown in FIG. 4 are forced to make contact with the optical fibers 410 due to external pressure applied thereto when the ribbon coating layer 420 is coated, so that the shape of the strength members 430 is deformed into a semicircular shape.

The strength members 430 are accommodated in the optical ribbon fiber 400, thereby reducing a volume of the optical ribbon fiber 400 and enhancing the tensile strength of the optical ribbon fiber 400. The strength member 430 is made of fiberglass reinforced plastics (FRP) having a thermal expansion coefficient about $5.0 \times 10^{-6}$/K to $1.0 \times 10^{-8}$/K.

Since the strength member 430 is made of material having a thermal expansion coefficient lower than a thermal expansion coefficient (about $1.0 \times 10^{-5}$/K) of the ribbon coating layer 420, a microbending phenomenon created in the optical fibers 410 due to a sudden temperature variation can be reduced. In addition, since the strength members 430 are made of material having the elastic coefficient above $1.0 \times 10^{3}$ N/mm$^2$, the tensile strength of the optical ribbon fiber 400 can be enhanced.

By coating the ribbon coating layer 420 onto outer surfaces of the strength members 430 and the optical fibers 410, the optical fibers 410 are bonded to the strength members 430.

Figure 5:
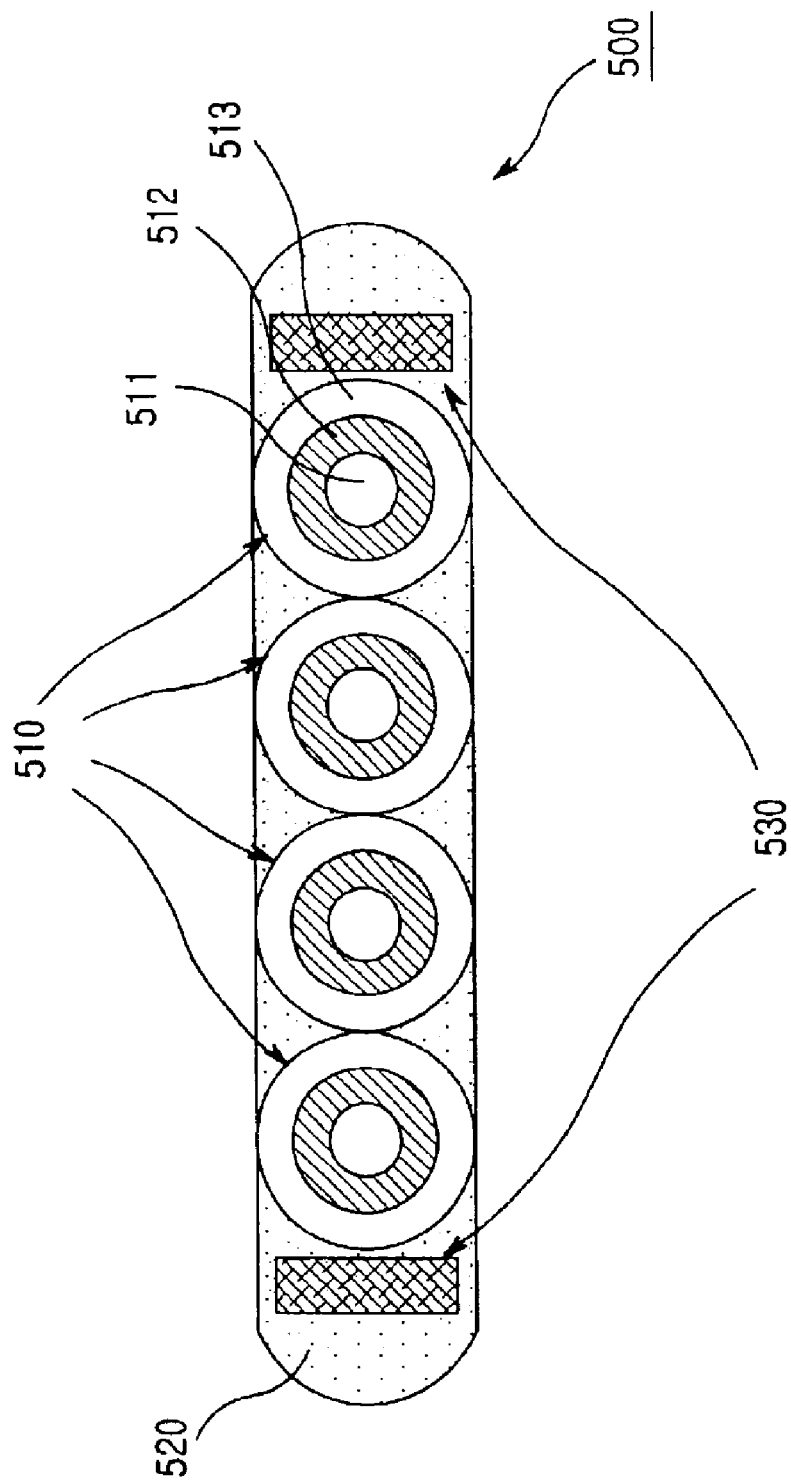
FIG. 5 is a sectional view showing an optical ribbon fiber having strength members accommodated therein according to a third embodiment of the present invention.

FIG. 5 is a sectional view showing an optical ribbon fiber 500 including strength members having a rectangular-shaped sectional area according to a third embodiment of the present invention. Referring to FIG. 5, the optical ribbon fiber 500 includes a plurality of optical fibers 510 aligned in series, strength members 530 and a ribbon coating layer 520.

The strength member 530 having the rectangular-shaped sectional area has a length identical to an outer diameter of the optical fiber 510. In addition, the strength members 530 are arranged at both sides of the optical fibers 510 in line with the optical fibers 510. The strength members 530 having the rectangular-shaped sectional area are accommodated in the optical ribbon fiber 500, so that a volume of the optical ribbon fiber 500 is reduced and the tensile strength of the optical ribbon fiber 500 is effectively improved.

Figure 6:
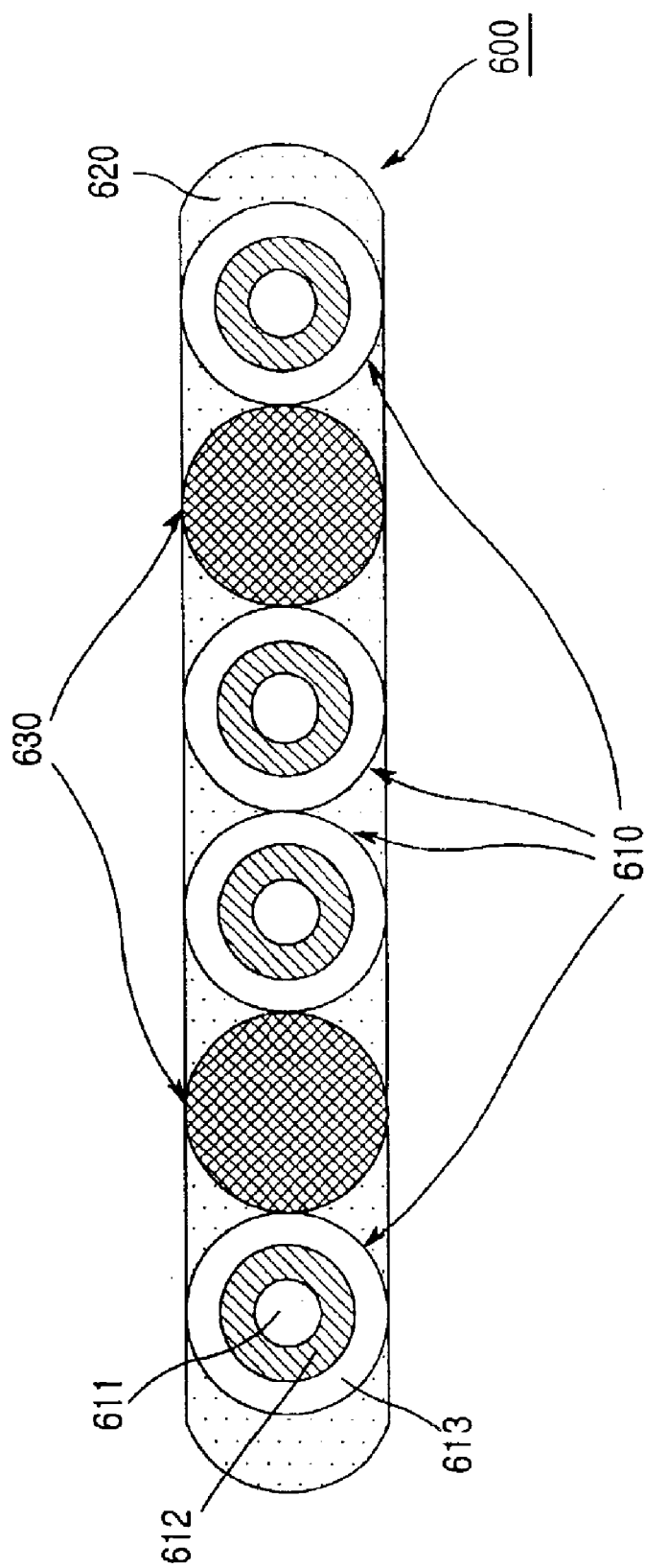
FIG. 6 is a sectional view showing an optical ribbon fiber having strength members accommodated therein according to a fourth embodiment of the present invention.

FIG. 6 is a sectional view showing an optical ribbon fiber 600 including strength members according to a fourth embodiment of the present invention. Referring to FIG. 6, the optical ribbon fiber 600 includes a plurality of optical fibers 610 aligned in series, strength members 630 and a ribbon coating layer 620.

The strength member 630 has a shape and a size identical to those of the optical fiber 610. In addition, the strength members 630 are interposed between the optical fibers 610, thereby improving physical characteristics including a tensile strength of the optical ribbon fiber 600.

The optical fiber 610 has a core 611 positioned at a center thereof, a clad 612 surrounding the core 611, and a coating layer 613 surrounding the clad 612. The optical fiber 610 transmits an optical signal based on a differential refractive index between the clad 612 and the core 611. In addition, the coating layer 613 absorbs external impact applied to the optical fiber 610, thereby protecting the clad 612 and the core 611.

As described above, the tensile strength of the optical ribbon fiber can be improved by accommodating various kinds of strength members in the optical ribbon fiber, so the optical ribbon fiber can effectively cope with a tensioning force, a bending force and an external impact applied thereto. In addition, the manufacturing process of an optical fiber cable can be simplified by using the optical ribbon fiber having a plurality of strength members therein. Furthermore, the physical characteristic of the optical ribbon fiber can be improved so that the optical ribbon fiber can be easily buried without using additional cables.

According to the present invention, strength members having various shapes, such as a semicircular shape or a rectangular shape, are accommodated in the optical ribbon fiber so that the tensile strength of the optical ribbon fiber is improved without enlarging a volume of the optical ribbon fiber. In addition, since the tensile strength of the optical ribbon fiber is improved, the optical ribbon fiber can be connected to a communication system without using additional optical fiber cable. Therefore, a capacity of the optical fiber is integrated and a cost for installing the optical ribbon fiber is reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical ribbon fiber comprising:
   a plurality of optical fibers aligned in a line;
   a pair of strength members each arranged at a respective end of the line in order to reinforce a tensile strength of the optical ribbon fiber, the pair of strength member having a rectangular shape and a height identical to an outer diameter of at least one of the plurality of the optical fibers; and
   a ribbon coating layer coated onto outer surfaces of the optical fibers and the strength members so as to bond the optical fibers to the strength members.

2. An optical ribbon fiber as claimed in claim 1, wherein the strength members have a thermal expansion coefficient of $5.0 \times 10^{-6}$/K to $1.0 \times 10^{-8}$/K.

3. An optical ribbon fiber as claimed in claim 1, wherein, when the strength members have an elastic coefficient above $1.0 \times 10^{3}$ N/mm$^2$.

4. An optical ribbon fiber as claimed in claim 1, wherein the optical fibers are aligned sideways.

5. An optical ribbon fiber comprising:
   a plurality of optical fibers aligned in a line;
   a pair of strength members each arranged at a respective end of the line in order to reinforce a tensile strength of the optical ribbon fiber, the pair of strength members having a semicircular shape and an outer diameter identical to an outer diameter of at least one of the plurality of optical fibers; and a ribbon coating layer coated onto outer surfaces of the optical fibers and the strength members so as to bond the optical fibers to the strength members.

6. An optical ribbon fiber as claimed in claim 5, wherein the strength members have a thermal expansion coefficient of $5.0 \times 10^{-6}$/K to $1.0 \times 10^{-8}$/K.

7. An optical ribbon fiber as claimed in claim 5, wherein, when the strength members have an elastic coefficient above $1.0 \times 10^{3}$ N/mm$^2$.

8. An optical ribbon fiber as claimed in claim 5, wherein the optical fibers are aligned sideways.

\* \* \* \* \*